United States Patent [19]

Ogawa

[11] Patent Number: 5,548,392
[45] Date of Patent: Aug. 20, 1996

[54] OPTICAL POSITION DETECTOR HAVING SCALE PATTERN SPOT-ILLUMINATED TO INCREASE RESOLUTION

[75] Inventor: Yasuji Ogawa, Otone-machi, Japan

[73] Assignee: Kabushikikaisha Wacom, Japan

[21] Appl. No.: 381,184

[22] Filed: Jan. 31, 1995

[51] Int. Cl.⁶ ................................................. G01J 3/30
[52] U.S. Cl. ................................................. 356/3.13
[58] Field of Search ................. 356/3.13, 9, 14; 250/206.1, 206.2

[56] References Cited

U.S. PATENT DOCUMENTS

| | | | |
|---|---|---|---|
| 4,948,258 | 8/1990 | Caimi | 356/376 |
| 5,081,345 | 1/1992 | Grenier et al. | 356/141 |
| 5,428,215 | 6/1995 | Dubois et al. | 356/141.5 |

FOREIGN PATENT DOCUMENTS 60-218002  10/1985  Japan.

*Primary Examiner*—Mark Hellner
*Attorney, Agent, or Firm*—Adams & Wilks

[57] ABSTRACT

An optical position detector is provided with an image forming member 1, a scale plate 2, and an image pickup 3, which are disposed sequentially along an optical axis in the order mentioned, and a position computing unit 10 connected to the image pickup 3. The scale plate 2 has a plurality of pattern elements arranged periodically along a front coordinate plane perpendicularly intersecting the optical axis. The image forming member 1 condenses a light beam emitted from an object point 4 and converts the same into a reference light converging into an image forming point and, at the same time, spot-illuminates a part, of the scale plate 2 with the reference light, and projects a certain pattern element in a magnified scale. The image pickup 3 has a light receiving surface disposed along a rear coordinate plane perpendicularly intersecting the optical axis and picks up the shadow of the pattern element projected in the magnified scale and outputs corresponding image data. The position computing unit 10 processes the image data and derives rear coordinate value of the shadow of the projected pattern element, and further determines a position of the image forming point on the basis of the rear coordinate value of the shadow and a front coordinate value of the certain pattern element, and thereby determines the position of the object point on the basis of the position of the image forming point.

17 Claims, 8 Drawing Sheets

OPTICAL POSITION DETECTOR HAVING SCALE PATTERN SPOT-ILLUMINATED TO INCREASE RESOLUTION

BACKGROUND OF THE INVENTION

1. Field of the Invention

This invention relates to an optical position detector for determining a position of a point of light source directly or indirectly emitting a light by the use of an image pickup device. More particularly, it relates to a technique for improving the accuracy of such an optical position detector as mentioned above.

2. Description of the Related Art

Heretofore, in the surveillance of the behavior of a land slide for example, targets composed of a point light source are regularly placed on a slope plane of a mountain. The beams of light directly or indirectly emitted from the points of light source are captured by a TV camera installed at a remote site. Then, image signals are analyzed, thereby detecting the positions of the individual targets. Particularly in cases where the surveillance requires data on three-dimensional displacement of the individual targets, the stereo method which uses two TV cameras is frequently adopted.

For the system of surveillance of this nature, in order to acquire an improvement in the accuracy of position determination, the TV camera used therein is required to possess improved resolution. For the purpose of improving the resolution, the number of pixel elements of the image pickup device such as CCD which is incorporated in the TV camera must be greatly increased. This increase, however, is difficult to achieve from the standpoint of the technology of manufacture.

A technique for apparently improving the resolution without requiring an increase in the number of pixel elements of the image pickup device has been proposed by JP-A-60-218,002, for example. This technique comprises attaching a cross filter to a lens of a TV camera, converting a light beam from a target into streaks of a cruciform image by means of the cross filter, and projecting the cruciform image on a light receiving surface of the image pickup device. The position of a point light source which forms the target is determined by subjecting the projected image to image processing and consequently finding by computation a cross point of the cruciform image. This conventional method, however, fails to produce clear streaks of the cruciform image unless the light beam from the point light source has a certain degree of intensity. Thus, it is at a disadvantage in being deficient in sensitivity.

SUMMARY OF THE INVENTION

In view of the task imposed on and still unfulfilled by the prior art as described above, this invention has for an object thereof the provision of an optical position detector endowed with improved resolution without increasing the number of pixel elements of an image pickup device and without sacrificing sensitivity. The optical position detector of the improved resolution according to this invention is basically composed of image forming means, a scale plate, and image pickup means sequentially arranged along an optical axis in the order mentioned, and arithmetic operation means connected to the image pickup means. In this construction, the scale plate is provided with a plurality of pattern elements arranged periodically along a front coordinate plane which is perpendicular to the optical axis. The image forming means fulfills the purpose of condensing a light beam emitted from an object point of a light source under surveillance, converting the same into a reference light converging into a corresponding image forming point, and causing the reference light to spot-illuminate a part of the scale plate, and consequently projecting a certain pattern element in a magnified scale. The image pickup means is provided with a light receiving surface disposed Mona a rear coordinate plane perpendicular to the optical axis and adapted to pick up an image of the certain pattern element projected in the magnified scale and to output a corresponding image data. Finally, the arithmetic operation means serves the purpose of processing the image data to calculate a rear coordinate value of a shadow of the projected pattern element, further detecting a position of the image forming point on the basis of the rear coordinate value and a front coordinate value of the certain pattern element, and thereby determining by computation a position of the object point under surveillance on the basis of the position of the image forming point.

The scale plate is provided with a plurality of pattern elements (such as, for example, lattice-like pattern elements) two-dimensionally arranged along the front coordinate plane. The image pickup means planarly picks up the image of pattern elements projected in a magnified scale and outputs a corresponding two-dimensional image data. The arithmetic operation means functions to process the two-dimensional image data to derive a two-dimensional rear coordinate value of the shadow of the projected pattern elements. The arithmetic operation means further computes a two-dimensional position of the image forming point on the basis of the two-dimensional rear coordinate values and the two-dimensional front coordinate value of the certain pattern element, and determines by computation a two-dimensional position of the object point under surveillance on the basis of the two-dimensional position of the image, forming point. In this case, the arithmetic operation means has moans for subjecting the two-dimensional image data to integration processing and for producing an orthogonal pair of one-dimensional profile data and analyzing the pair of the one-dimensional profile data to determine the two-dimensional rear coordinate value mentioned above. In cases where a three-dimensional data is handled in place of the two-dimensional data, the image pickup means picks up at least one pair of shadows of pattern elements projected in a magnified scale and outputs corresponding image data. The arithmetic operation means processes the image data and derives two-dimensional rear coordinate values of the pair of the shadows of the projected pattern elements, and further determines by computation a three-dimensional position of the image forming point on the basis of the two-dimensional rear coordinate values and the two-dimensional front coordinate values of the pair of the certain pattern elements, and thereby determines by computation a three-dimensional position of the object point under surveillance on the basis of the three-dimensional position of the image forming point.

The optical position detector constructed as described above is capable of handling a plurality of object points as well as one object point for the purpose of surveillance. In this case, the image pickup means picks up a plurality of shadows of pattern elements projected in a magnified scale as mutually separated by light beams emitted from many object points and outputs corresponding image data. The arithmetic operation means processes the image data and produces rear coordinate values for each of the shadows of the projected pattern elements, and consequently determines by computation the positions of the plurality of the object points under surveillance independently and simultaneously. In this case, the point of light sources which form the object points under surveillance have relatively small luminous energies. Thus, the image pickup means is furnished with an image into intensifier which is capable of intensifying photoelectrons for amplifying a weak reference light. The optical position detector further incorporates therein a computer for effecting comprehensive surveillance of the state of movement or the state of displacement of a plurality of object points by analyzing along over a course of time the data outputted by the arithmetic operation means. Thus, a system of surveillance can be constructed.

According to this invention, the displacement of the point of a light source forming the object point for surveillance can be detected in a magnified scale by interposing a scale plate between the image forming means and the image pickup means. Pattern elements formed on the scale plate are projected in a magnified scale on the light receiving surface of the image pickup means. As a result, the resolution of the position of the object point under surveillance can be improved without increasing the number of pixel elements of the image sensor which is incorporated in the image pickup means. Particularly, since it is difficult to increase the number of pixel elements in a two-dimensional image sensor from the standpoint of fabrication technology of manufacture, the fact that this invention permits improvement of resolution by "optical space modulation" forms a practical worth and promises to open up an applied field which has never been attained heretofore. Further, the combination of the image pickup means and the image intensifier enables the surveillance to be attained with high accuracy owing to the high sensitivity of the image intensifier. When a plurality of object points under surveillance are mutually separated to a certain extent, the positions of the plurality of point light sources can be simultaneously detected. The surveillance of the land behavior such as a land slide or else, therefore, can be attained by the present invention. By connecting the optical position detector constructed as described above to a computer, an applied system for surveying a moving object can be easily constructed. This system permits real-time determination of the behavior of a moving object with high accuracy and high speed.

DETAILED DESCRIPTION OF EMBODIMENTS

Figure 1:
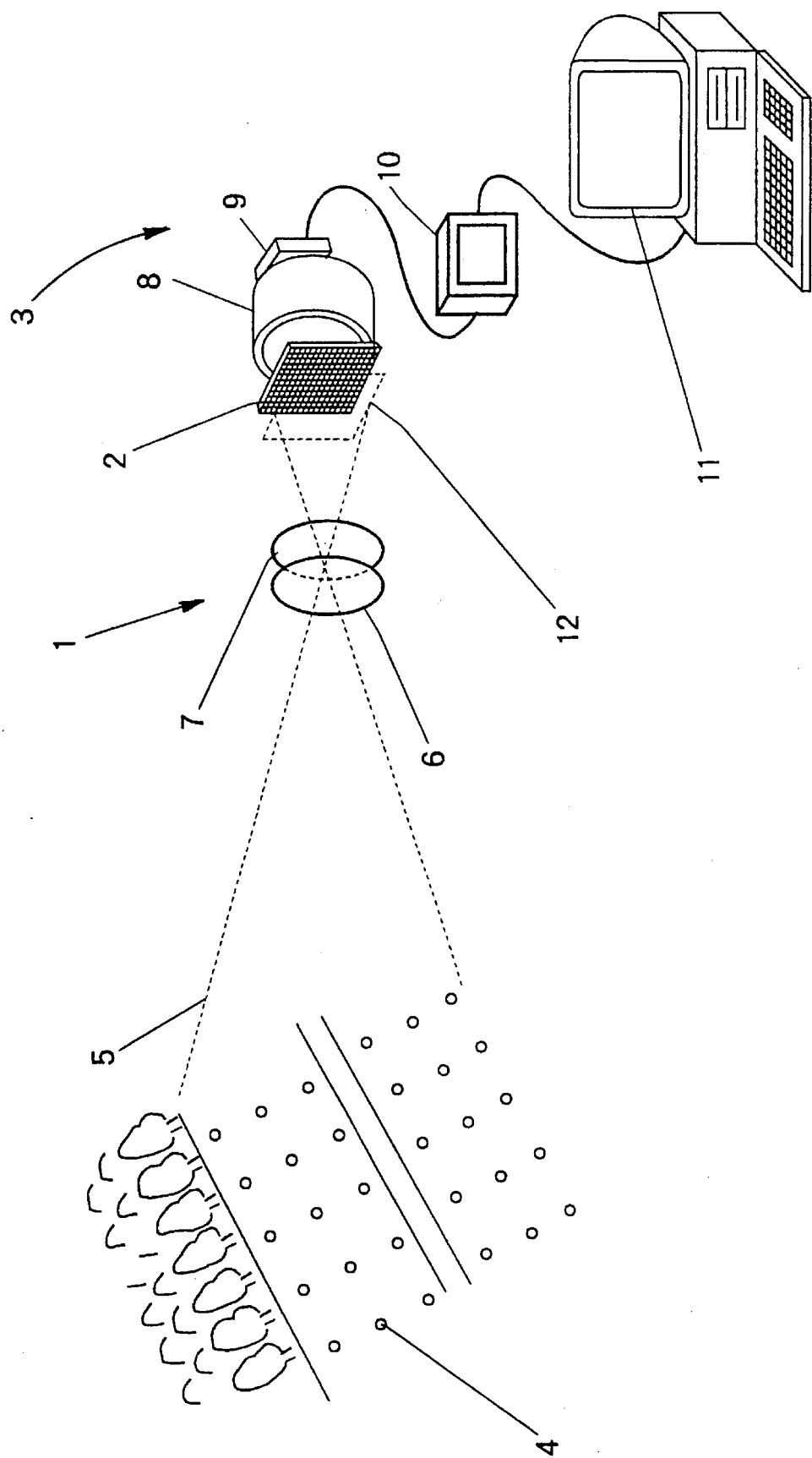
FIG. 1 is a block diagram showing the basic construction of an optical position detector according to this invention.

Now, preferred embodiments of this invention will be described specifically below with reference to the annexed drawings. FIG. 1 is a block diagram showing the basic construction of the optical position detector according to this invention. As illustrated in the diagram, this optical position detector is provided with image forming means 1, a scale plate 2, and image pickup means 3 sequentially arranged along an optical axis in the order mentioned. A plurality of object points 4 subjected to measurement or surveillance are placed in the direction of the optical axis. In the present, embodiment, the plurality of the object or target points 4 for surveillance are arranged along a slope plane 5 of a mountain and can be utilized for monitoring or prediction of a land slide or else of the mountain. The target points 4 of surveillance are each composed of a point light source and may be formed of a light-emitting element such as an LED. A reflecting light, source, for example, a corner cube 1nay be used in place of the light-emitting element. The image forming means 1 comprises a band pass filter 6 and an objective lens 7. The band pass filter 6 is formed of a multilayer filter and is adapted to selectively pass only an infrared wavelength contained in the light flux or beam emitted from the point light source. The image pickup means 3 is composed of an image intensifier 8 and a CCD image sensor 9. A position computing unit 10 or arithmetic operation means is connected to the CCD sensor 9. A computer 11 is connected to the position computing unit 10.

The scale plate 2 which is a characteristic component of this invention is provided with a plurality of pattern elements arranged periodically along a front coordinate plane which perpendicularly intersects the optical axis. In the present embodiment, a plurality of pattern elements (lattice-like pattern elements) are formed in a two-dimensional array. It should be noted that the two-dimensional scale pattern is not limited to lattice-like pattern elements but may be formed of dot pattern elements which are arrayed in the form of a matrix. Further, by using a one-dimensional stripe pattern in place of the two-dimensional scale pattern, one-dimensional position of the target points under surveillance may be determined by computation. The scale plate 2 is disposed at a position behind an image forming plane 12 of the objective lens 7. This particular position is intended for the purpose of illuminating the scale plate 2 by an incident light in a defocused state through the objective lens 7. It is, therefore, conceivable to have the scale plate 2 disposed at a front side of the image forming plane 12, if desired.

The objective lens 7 collects and condenses the light beam emitted from the individual target point 4 under surveillance and converts the same into a reference light beam which converges into a corresponding image forming point on the image forming plane 12 and, at the same time, spot-illuminates a part of the scale plate 2 with the reference light and projects a certain pattern element in a magnified scale. The CCD image sensor 9 has a light receiving surface disposed along a rear coordinate plane perpendicularly intersecting the optical axis and is adapted to pick up a shadow of the pattern element projected in a magnified scale and outputs a corresponding image data. The position computing unit 10 processes the image data and derives the rear coordinate value of the shadow of the projected pattern element, determines by computation a position of the image forming point on the basis of the rear coordinate value of the shadow and a front coordinate value of the original pattern element, and further determines by computation the position of the target point 4 under surveillance on the basis of the position of the image forming point. In the present embodiment, the CCD image sensor 9 picks up the plurality of shadows of pattern elements projected in a magnified scale, mutually separated by the light beams emitted from the plurality of the target points under surveillance, and outputs corresponding image data. The position computing unit 10 processes the image data and derives rear coordinate values of the individual shadows of pattern elements and consequently determines by computation the positions of the plurality of target points 4 under surveillance independently from each other and simultaneously. The position data which is issued from the position computing unit 10 is analyzed continuously along the course of time by the computer 11 to effect comprehensive monitoring of the state of movement or the state of displacement of the target points 4 under surveillance. Thus, the behavior of the slope plane 5 of a mountain can be surveyed and accidents such as land slide can be predicted. In the system of surveillance of this nature, the optical position detector is located remotely relative to the slope plane 5 of the mountain subjected to the surveillance. Since the luminous energies which originate from the individual points 4 under surveillance and which arrive at, the detector are extremely small and the reference lights are designed to be feeble, occasionally the scale plate 2 will not be illuminated with a practically adequate luminous intensity. In the present embodiment, therefore, the CCD image sensor 9 is combined with the image intensifier 8 to allow amplification of the feeble or weak reference lights. Though the image intensifier 8 fulfills the purpose of enhancing sensitivity, it has the possibility of impairing the overall resolution of the detector because it has a lower resolution than the CCD image sensor 9. In this respect, since this invention substantially improves the resolution by the optical space modulation due to the use of the scale plate 2, the possible degradation of quality due to the incorporation of the image intensifier 8 can be avoided.

Figure 2:
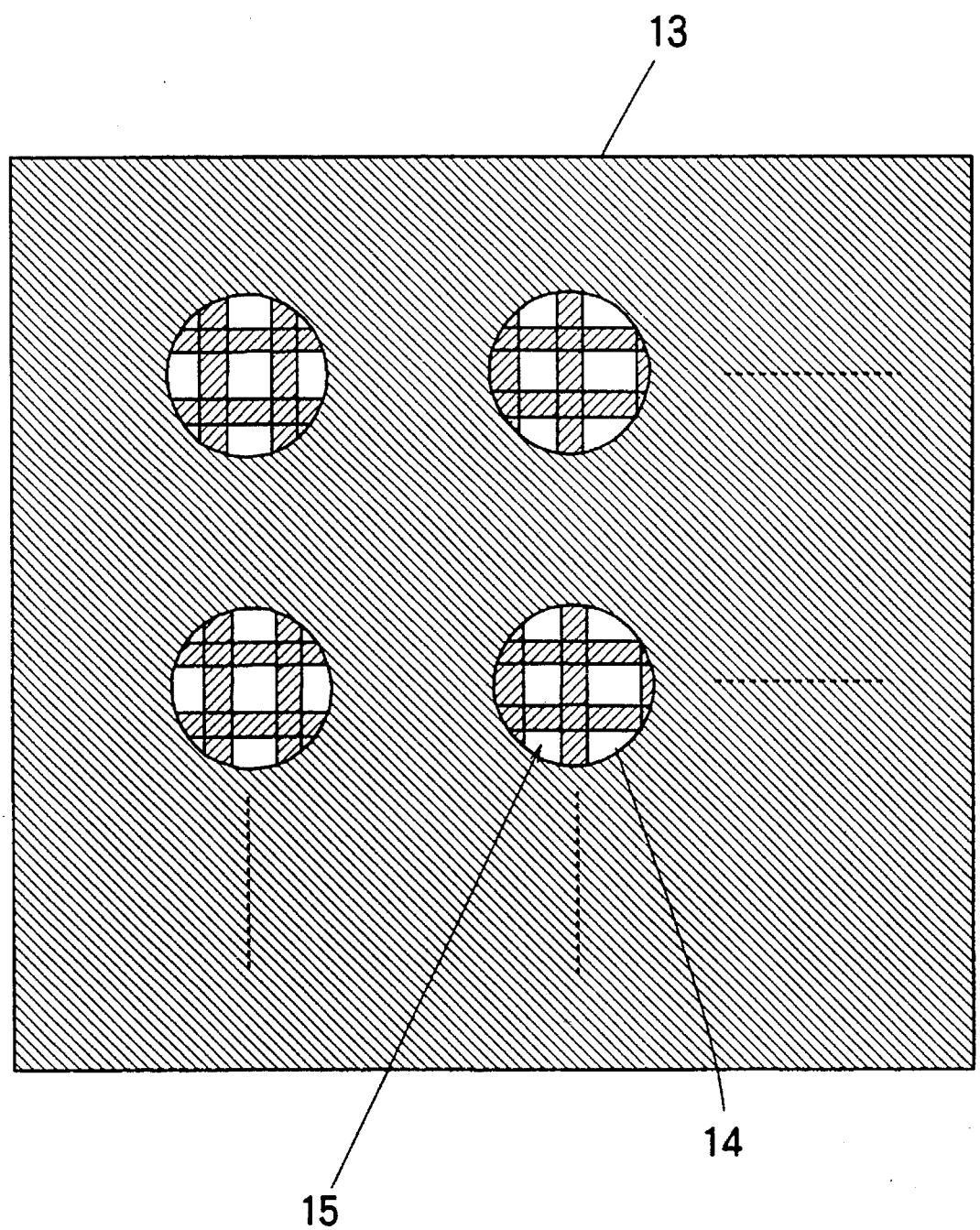
FIG. 2 is a plan view of a magnified projected image of scale patterns.

FIG. 2 shows one example of a projected image produced in a magnified scale on a light receiving surface 13 of the CCD image sensor 9. The magnified and projected image includes a spot image 14 corresponding to the individual target point under surveillance. In each spot image 14, a shadow 15 of a pattern element is depicted. In the present embodiment, the scale plate is possessed of the lattice-like pattern elements which are periodically arrayed two-dimensionally along the front coordinate plane as mentioned above. On the light receiving surface 13, therefore, the lattice-like shadow 15 of the projected pattern element which is spot-illuminated and projected in a magnified scale by the defocused reference light will be depicted. In response to this projection, the CCD image sensor outputs two-dimensional image data. Then, the position computing unit 10 processes the two-dimensional image data and derives a two-dimensional rear coordinate value of the shadow 15 of the pattern element, and then determines by computation the two-dimensional position of the image forming point of each target on the basis of the two-dimensional rear coordinate value of the shadow and the two-dimensional front coordinate value of the pattern element itself, and further determines the two-dimensional position of the corresponding object point of the image forming point under surveillance on the basis of the two-dimensional positions of the image forming point.

Figure 3:
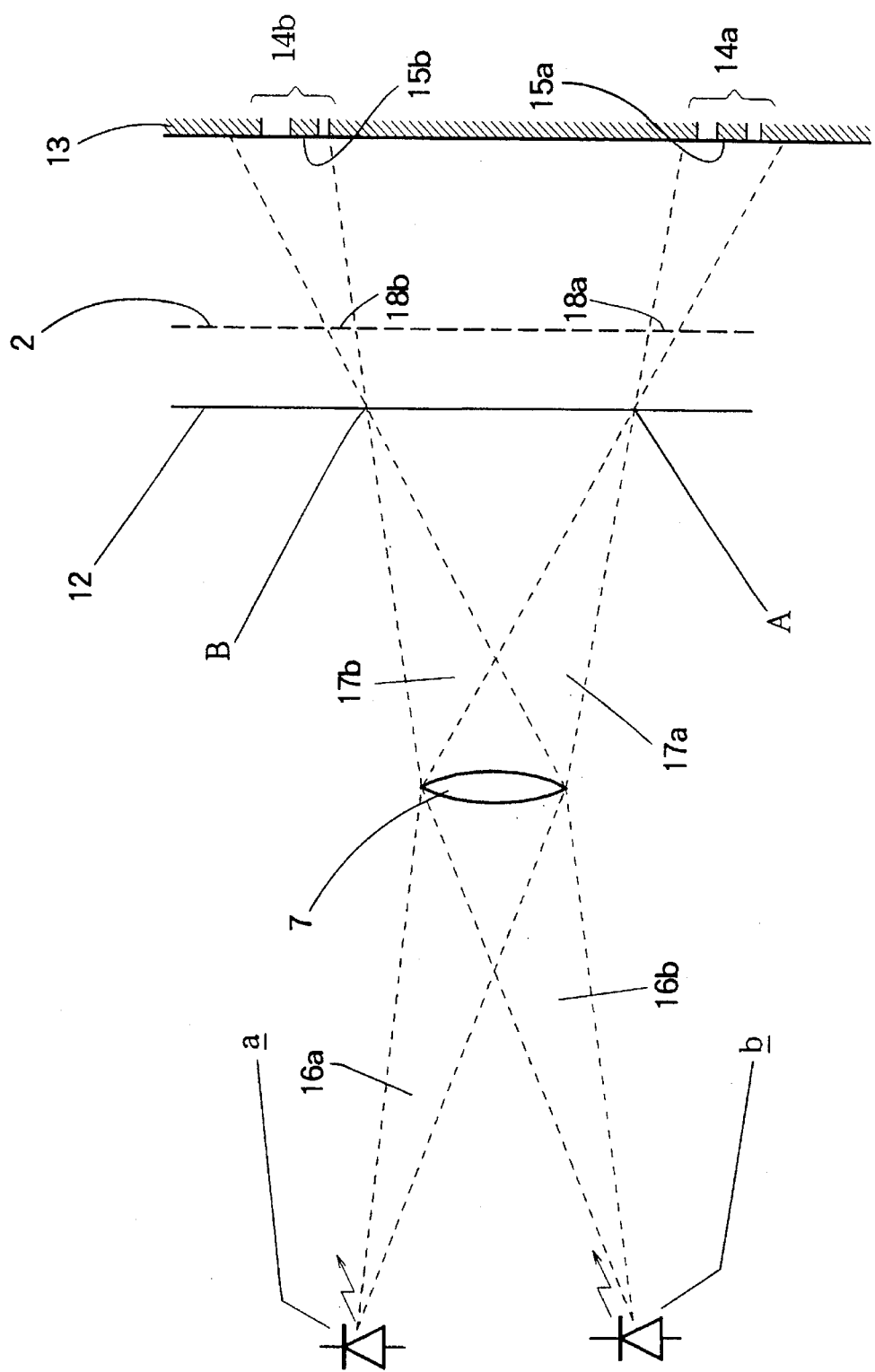
FIG. 3 is a geometrical optic diagram of an optical position detector according to this invention.

FIG. 3 is a geometrical optic diagram of the optical position detector according to this invention. In the present embodiment, a pair of light-emitting elements a and b are arranged as points of surveillance to facilitate understanding. A light beam or flux 16a emitted from the light-emitting element a is condensed or collected by the objective lens 7 and focused as a corresponding image forming point A on the image forming plane 12. In other words, the incident light flux 16a is converted by the objective lens 7 into a reference light 17a which converges into the image forming point A. The scale plate 2 is disposed along the front coordinate plane which perpendicularly intersects the optical axis and which is separated from the image forming plane 12. A certain pattern element 18a formed on the scale plate 2 is spot-illuminated or spotted by the reference light 17a so as to produce a corresponding projected shadow 15a of the pattern element, 18a in a magnified scale on the light receiving surface 13. This shadow 15a of pattern element is included in a spot image 14a. The image receiving surface 13 is disposed the rear coordinate plane which perpendicularly intersects the optical axis. An incident light flux 16b emitted from the other light-emitting element b is likewise converted into a reference light 17b by the objective lens 7 to produce an image forming point B on the image forming plane 12. The reference light 17b projects a certain pattern element 18b in a magnified scale so as to produce a corresponding shadow 15b of the pattern element 18b in conjunction with a spot image 14b.

As clearly noted from the geometric relation shown in the diagram, the pattern elements 18a and 18b are spot-illuminated by using the corresponding image forming points A and B as virtual point light sources, and are projected in a magnified scale on the light receiving surface 13. The magnification of the shadows 15a and 15b of pattern elements, therefore, is proportionate to the ratio of the distance from the image forming plane 12 to the scale plate 2 and the distance from the image forming plane 12 to the light receiving surface 13. For example, 6 to 8 magnifications are obtained by setting a distance of about 0.5 mm between the image forming plane 12 and the scale plate 2, and a distance of about 3 to 4 mm between the scale plate 2 and the light receiving surface 13. Thus, the resolution is improved proportionally to the magnification. In this case, the pattern elements arrayed on the scale plate 2 are spaced at a pitch of about 80 μm. The magnification rate mentioned above is calculated on the assumption that the image forming plane 12 is kept in a fixed state. However, practically, the image forming plane 12 is moved in proportion to the distance of the objective lens 7 relative to the light-emitting element and the magnification ratio is slightly varied, depending on the optical construction of the objective lens 7. In cases where the image forming plane 12 is to be fixed, the fixation may be obtained by using a lens of a small focal length or by incorporating an automatic focusing mechanism in the system.

The CCD image sensor 9 which is disposed on the light receiving surface 13 picks up a shadow of a pattern element projected in a magnified scale and outputs corresponding image data as described above. The position computing unit 10 processes the image data and derives a rear coordinate value of the shadow 15a of the pattern element 18a, for example. It then determines by computation the position of the image forming point A on the basis of the rear coordinate value of the shadow 15a and the front coordinate value of the original pattern element 18a. It is clearly noted from the geometrical optic relation illustrated in the diagram, that the image forming point A is positioned on a straight line, which interconnects the shadow 15a and the corresponding pattern element 18a and which intersects the image forming pane 12. The position of the corresponding light-emitting element a can be determined by computation of the lens formula on the basis of the position of the image forming point A detected as described above. Thus, the two-dimensional position of the light emitting element a can be determined.

In cases where the image forming plane 12 has a variable position, a single straight line which interconnects the shadow 15a and the pattern element 18a with each other cannot determine the position of the image forming point A. In this case, the position of the image forming point A is determined by obtaining two straight lines interconnecting at least one pair of shadows of pattern elements and one pair of corresponding original pattern elements. The image forming point is determined by computing a intersection of these two straight lines. The determination in this case, therefore, automatically produces a three-dimensional position of the image forming point A. The detector of the present embodiment, therefore, allows the three-dimensional position of the corresponding light emitting element to be determined by computation.

Figure 4:
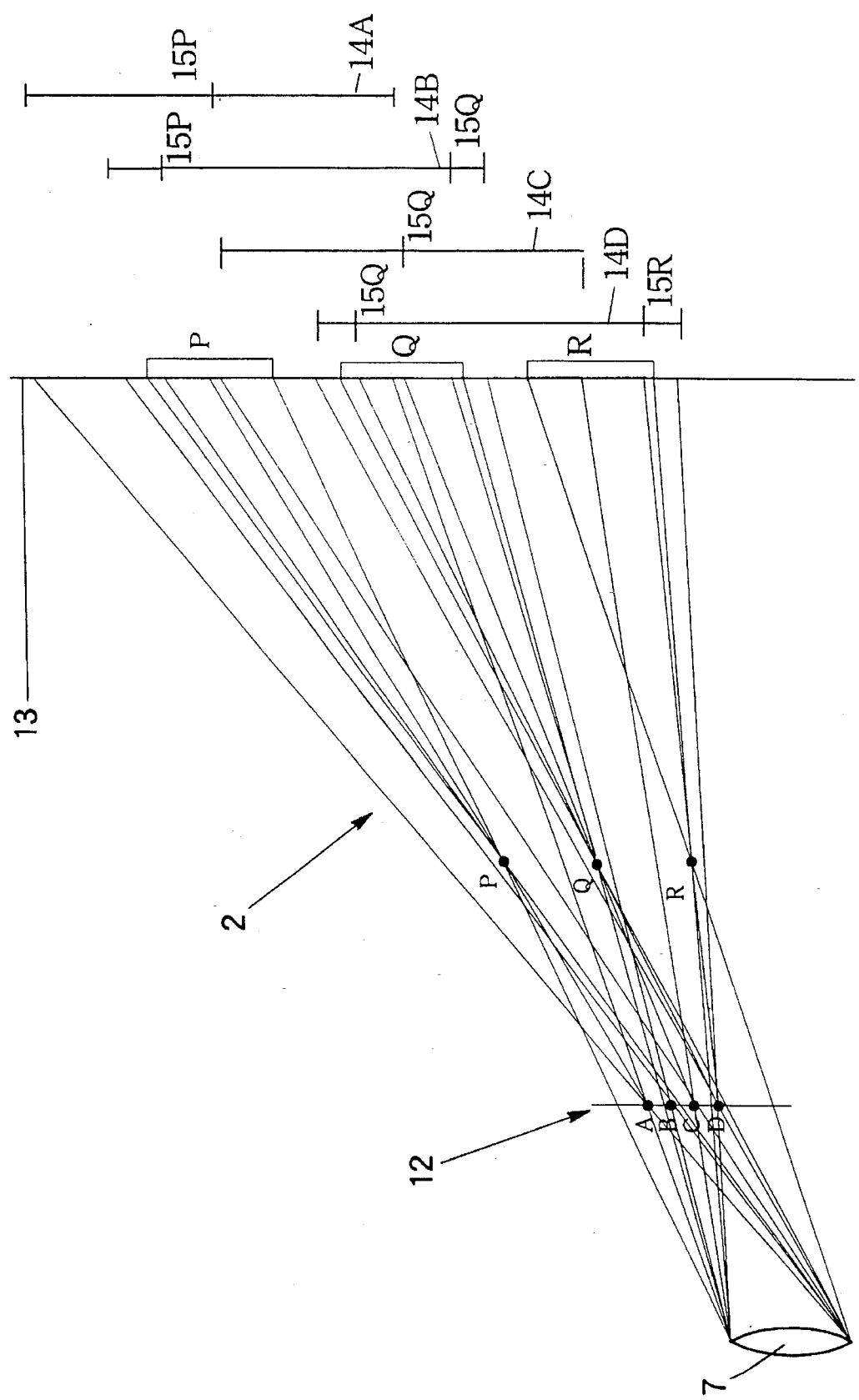
FIG. 4 is a similar geometrical optic diagram.

FIG. 4 is a geometrical optic diagram showing a range of movement of a spot image and a range of projection of a pattern element obtained when one light emitting element (not shown) is moved in a direction crossing the optical axis. The diagram depicts the state in which the image forming point changes its position in the direction from A to D along the image forming plane 12 in consequence of the movement of the light emitting element. The spot images which are projected on the image forming surface 13 move or shift as represented by 14A, 14B, 14C, and 14D in response to the movements of image forming points A, B, C, and D. The scale plate 2 has a plurality of pattern elements P, Q, and R set therein. At one time, in the spot image 14A; a shadow 15P corresponding to a pattern element P is produced. When the spot image 14A shifts to the next spot image 14B, the shadow 15P moves upward and, at the same time, a shadow 15Q corresponding to the next pattern element Q begins to enter the lower end side of the spot image 14B. The spot image 14B, therefore, eventually includes two shadows 15P and 15Q of pattern elements P and Q. When the spot image 14B subsequently shifts to the spot image 14C, the shadow 15Q advances to the center and the preceding shadow eventually leaves from the spot image 14C. When the spot image 14C further shifts to the spot image 14D, the shadow 15Q of the pattern element Q advances to the upper end side and a shadow 15R corresponding to another pattern element R begins to enter. As a result, the spot image 14D eventually includes the two shadows 15Q and 15R of the pattern elements Q and R. In cases where a plurality of shadows of pattern elements are included for one spot image, one shadow of a pattern element must be specified for determination of the coordinate value. In this case, this specified shadow may be obtained by computing the central position of the spot image by image processing and by selecting the shadow of a pattern element which is nearest to the central position. In other words, this procedure is equivalent to contracting the area of the spot image by narrowing the aperture of the objective lens 7.

The projection ranges of the pattern elements P, Q, and R are shifted along the light receiving surface 13, and are allowed to assume certain widths in consequence of the movements of the spot images 14A through 14D. Though the projection ranges of the pattern elements P, Q, and R do not overlap each other on the light receiving surface 13, the individual pattern elements can be specified by image processing. To be specific, the projection range of all the pattern elements are stored provisionally in the form of table data. The reference to these table data permits an original pattern element corresponding to a given shadow to be specified on the basis of the coordinate value of the shadow. Thus, the individual pattern elements are definitely discriminated from one another, while they may be varied in size and shape.

Figure 5:
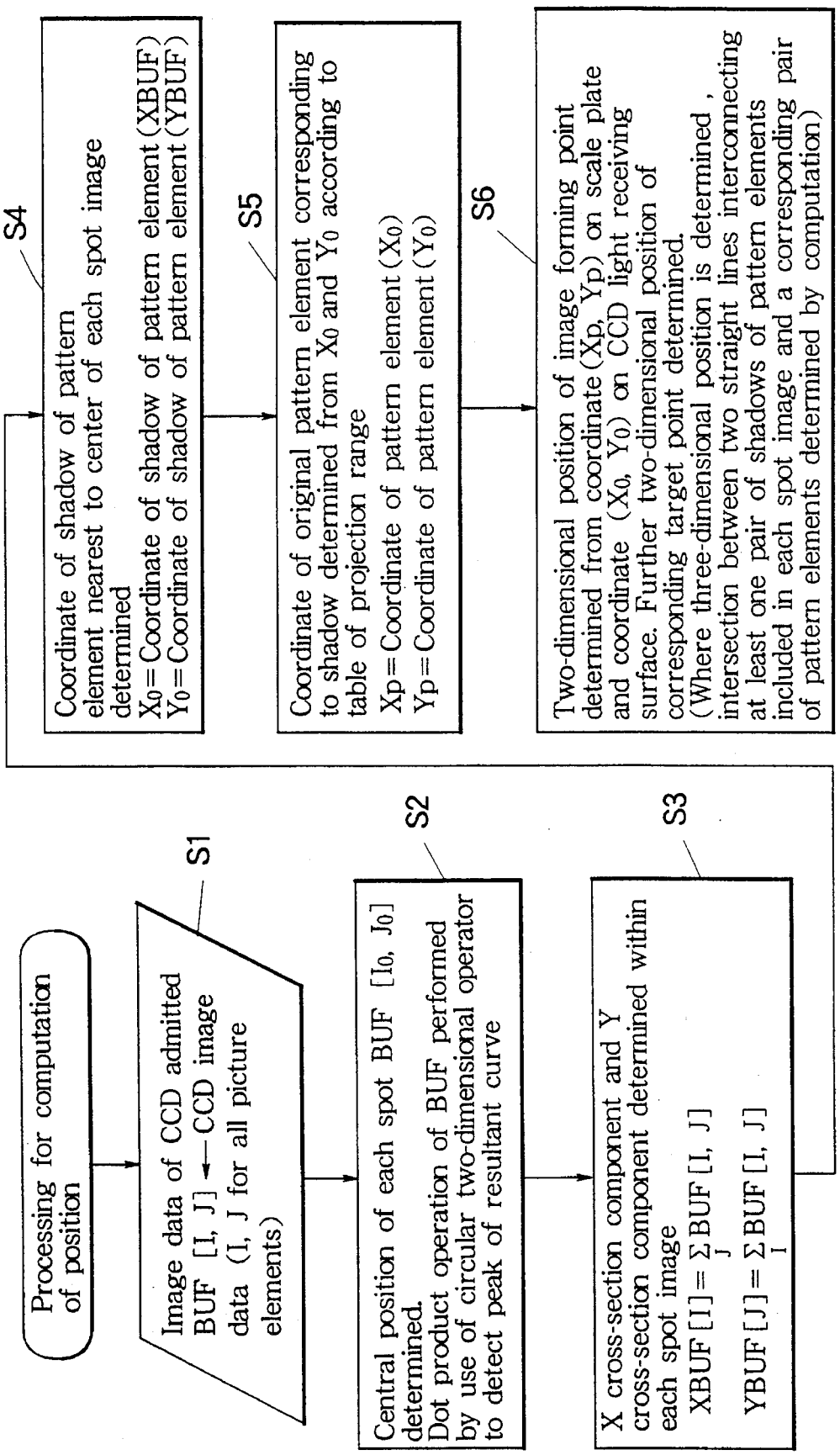
FIG. 5 is a flow chart to aid in the explanation of the operation of the optical position detector according to this invention.

Now, the processing for determining the positions of target points by computation will be described in detail below with reference to the flow chart of FIG. 5. First, at the step S1, the image data which is issued from the CCD image sensor is admitted. Here, the image data so admitted is represented by BUF [I, J]. The symbols I and J represent the column number and the row number which are assigned to all the picture elements. FIG. 2 depicts BUF [I, J] in the collective form. It is clearly noted from FIG. 2 that the image data includes a plurality of circular spot images 14.

Figure 6:
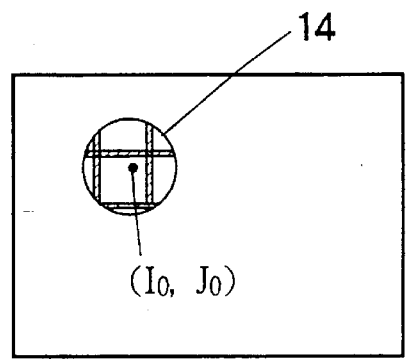
FIG. 6 is a model diagram to aid in the explanation of the operation of the inventive device.

Then, at, the step S2, the central position BUF $[I_0, J_0]$ of the individual spot image is determined. FIG. 6 depicts the arithmetic operation involved herein in a typical model. It should be noted, however, that FIG. 6 shows only one spot image 14 to facilitate understanding. Specifically, the determination of the central position of the individual spot image may be attained, for example, by peforming a dot, product operation on BUF by the use of a two-dimensional annular operator and by extracting a peak from the resultant curve.

Figure 7:
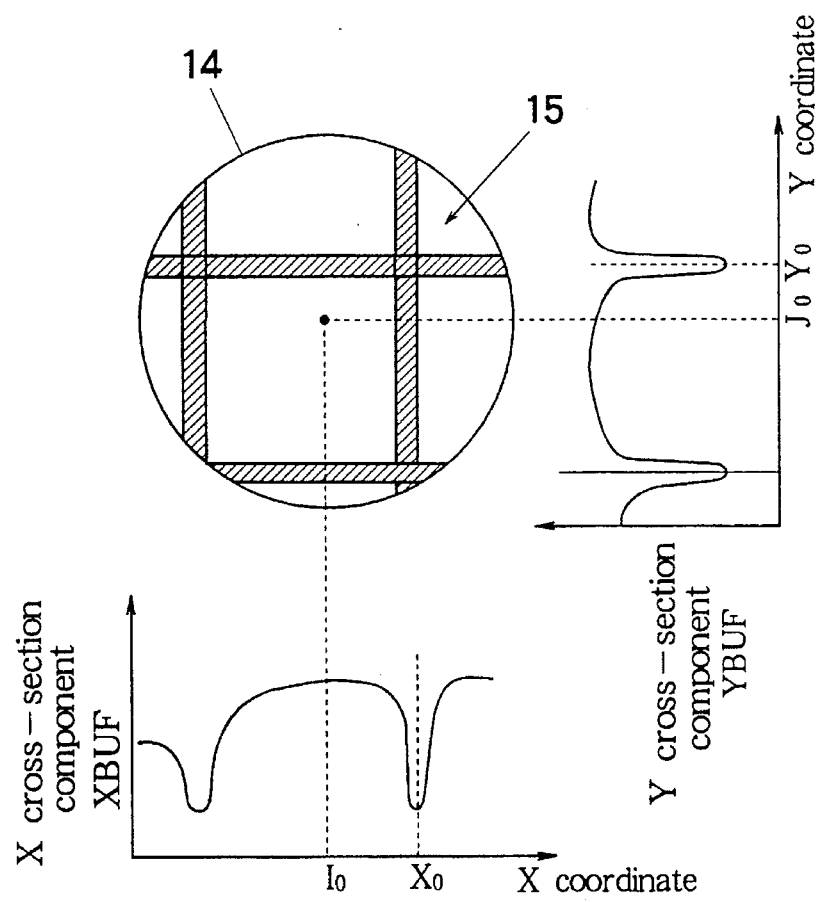
FIG. 7 is a model diagram to aid in the explanation of the operation of the inventive detector.

Now, at the subsequent step S3, an X cross-section component (X profile) and a Y cross-section component (Y profile) are determined within an area of the individual spot image. FIG. 7 depicts the arithmetic operation involved in this determination process in a typical model. To be more specific, by subjecting the columns and the rows of the two-dimensional image data BUF to integration, thereby forming an orthogonal pair of one-dimensional cross-section data (X cross-section component and Y cross-section component). The orthogonal pair of the one-dimensional cross-sectional data are analyzed to detect the two-dimensional rear coordinate of the shadow 15 of the projected pattern element. Particularly, the integration processing can make up for the decrease in intensity of the reference light due to defocussing. In the example shown in FIG. 7, the spot image 14 includes two shadows of pattern elements in the direction of row, hence two peaks appear in the X cross-section component XBUF. Since the spot image 14 includes two shadows of pattern elements in the direction of column, the Y cross-section component YBUP likewise includes two peaks.

Then, the next step S4 is undertaken to determine the two-dimensional rear coordinate value ($X_0$ and $Y_0$) of the shadow nearest to the central position ($I_0$ and $J_0$) of each spot image 14. The arithmetic operation for this determination is also depicted in a typical model in FIG. 7.

Figure 8:
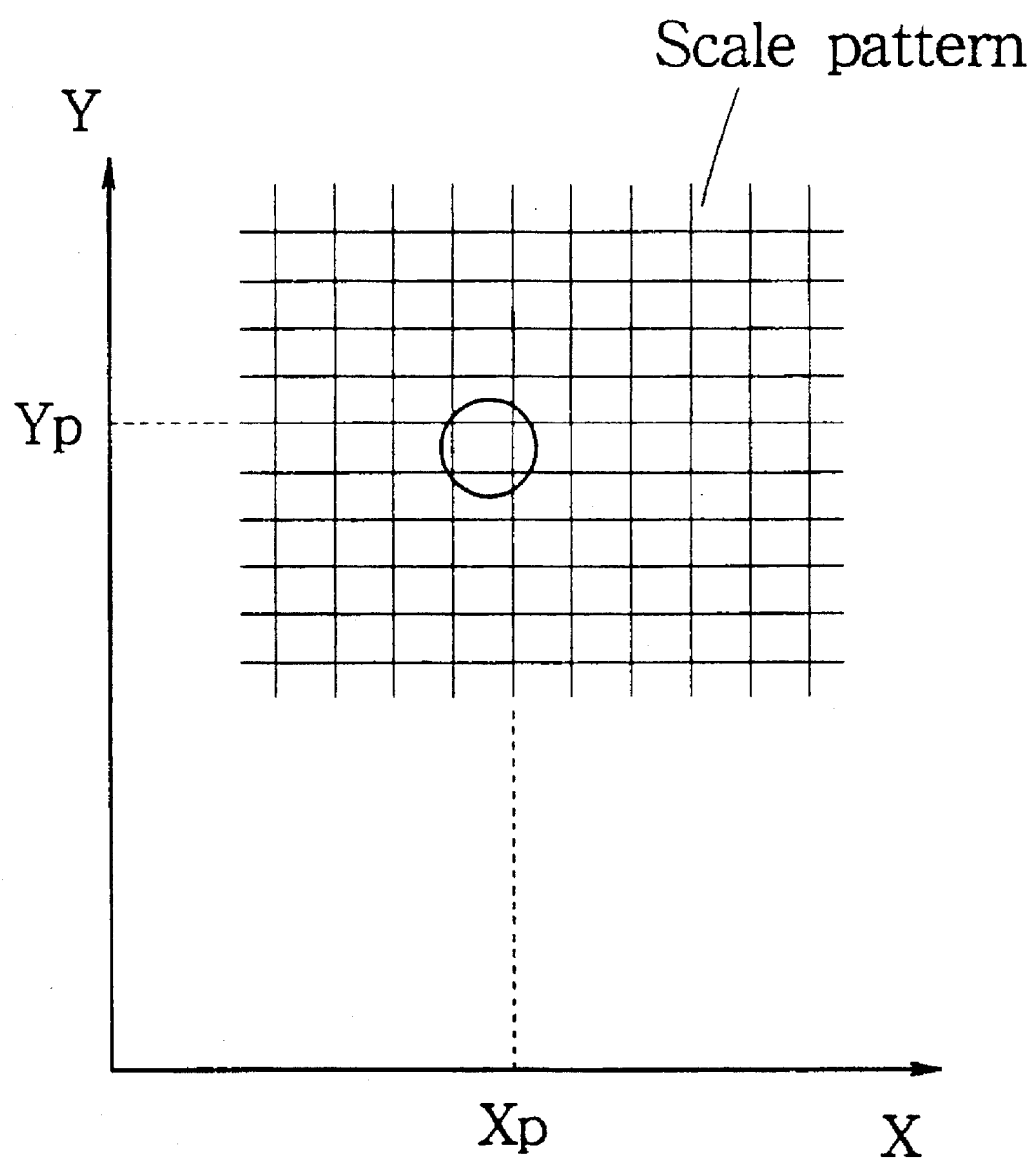
FIG. 8 is a model diagram to aid in the explanation of the operation of the inventive detector.

At the subsequent step S5, the two-dimensional front coordinate value ($X_p$ and $Y_p$) of the original pattern element corresponding to the shadow projected at ($X_0$ and $Y_0$) is determined by reference to the table showing the projection range mentioned above. For the sake of better understanding, one example of the scale pattern assigned with the front coordinate plane (X and Y) is shown in FIG. 8.

At the final step S6, the two-dimensional position of the image forming point is determined on the basis of the two-dimensional front coordinate on the scale plate ($X_p$ and $Y_p$) and the two-dimensional rear coordinate on the CCD light receiving surface ($X_0$ and $Y_0$). Further, the two-dimensional position of the corresponding target point under surveillance is determined. In cases where a three-dimensional position is to be determined the determination may be attained by computing an intersection of two straight lines interconnecting at least one pair of shadows of pattern elements included in each spot image and the corresponding pair of pattern elements.

Figure 9:
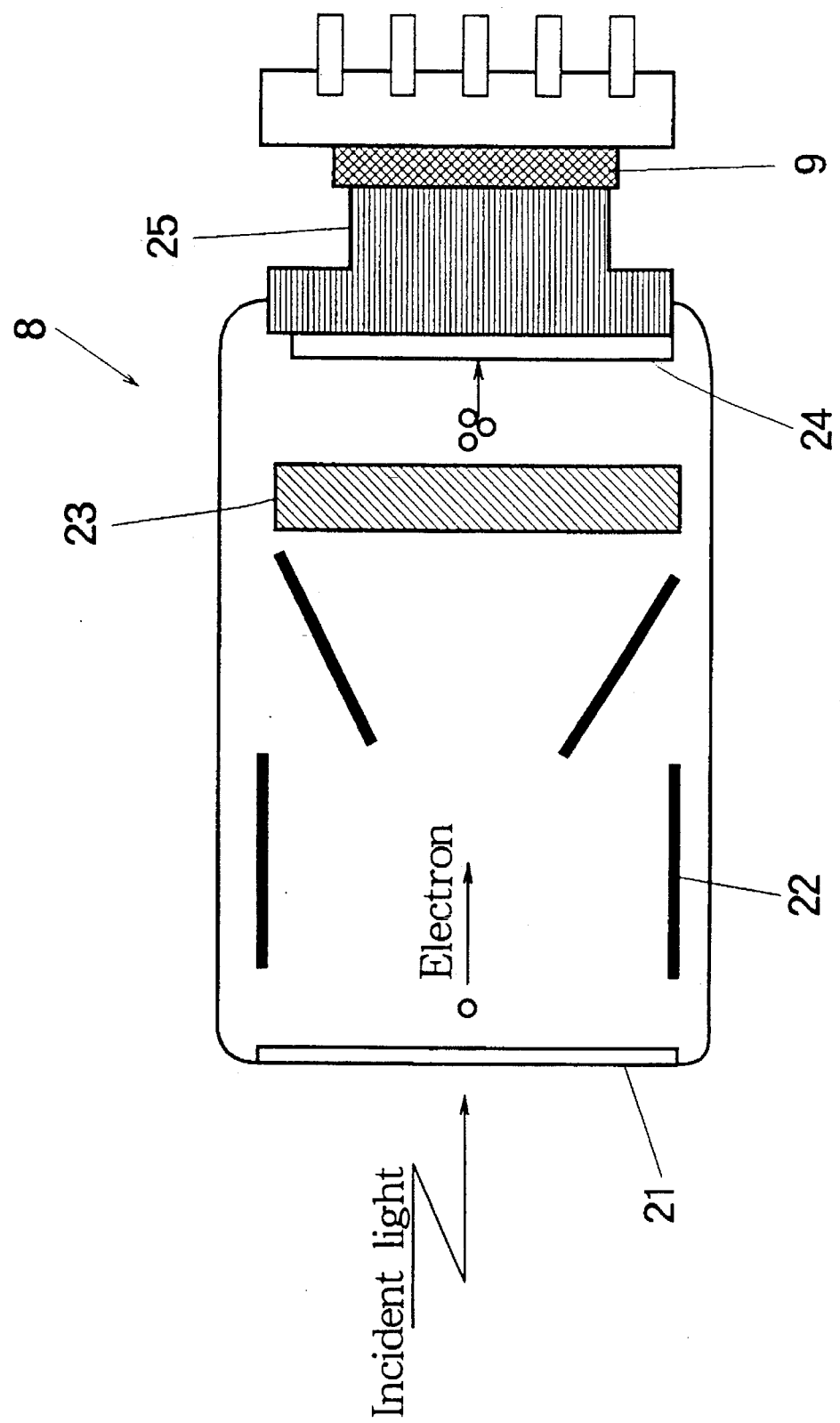
FIG. 9 is a cross section showing one example of an image intensifier incorporated in the optical position detector according to this invention.

Finally, one example of a high sensitivity video camera which has the CCD image sensor 9 and the image intensifier 8 will be described below with reference to FIG. 9. This camera can pick up even a very feeble planar image with extremely high sensitivity. When a magnified and projected image is formed on an input surface through an optical system such as a lens (not shown) as illustrated in the diagram, a thin semiconductor film 21 formed on the input surface releases electrons at an amount proportional to an incident light. An electron image thus formed is projected by an electron lens 22 onto a micro-channel plate 23. This micro-channel plate 23 is a device of a thin plate having independent, secondary electron multipliers arranged two-dimensionally by piling numerous very thin channels having an inner wall formed of a material possessing a secondary electron discharging property. The electrons which have entered the individual channels of the micro-channel plate 23 collide against the wall surfaces of the channels, and the channels consequently generate an average of about two secondary electrons per one primary electron. The incident electrons during the passage through the channels, therefore, repeat a plurality of collisions on the wall surfaces and consequently get multiplied to some thousandfold. Further, the electrons which are emitted from the micro-channel plate 23 are accelerated at a high voltage and then caused to collide against a fluorescent film 24 formed on the output surface and consequently converted into a light. Thus, on the output surface, an image about 10,000 times as bright as the input image is generated. Thereafter, the bright intensified output image is picked up by the CCD image sensor 9. In this case, a fully bright image surface is obtained by allowing interposition of a fiber optic plate 25 which is produced by bundling a multiplicity of optical fibers and enabled to transmit two-dimensional image information from one image surface to another.

The point light source used as the target point for surveillance of positional displacement can be detected in a magnified scale by placing a scale plate near an image forming plane and by causing pattern elements contained in the scale plate to be projected in a magnified scale on a light receiving surface according to this invention as described above. The optical position detector, therefore, has improved resolution for the detection of positions of the target points under surveillance without increasing the number of pixel elements of an image pickup device. Since it is difficult to increase the number of pixel elements particularly in a two-dimensional image sensor from the standpoint of technology of manufacture, this invention enjoys an ample practical value and promises to open up an applied field which has never been attained heretofore. Further, the combination of an image pickup device with an image intensifier enables the determination of the positions of the target points under surveillance to be attained with high accuracy owing to the high sensitivity of the device. Besides, the positions of a plurality of target points under surveillance can be simultaneously detected so long as the point light sources are disposed as separated to a certain extent, hence this invention allows high-speed surveillance of the land behavior such as a land slide. When the optical position detector constructed as described above is connected to a computer, it can easily construct an applied system for the surveillance of a moving object. This system permits real-time determination of positions of a moving object to be attained with high accuracy and high speed.

What is claimed is:

1. An optical position detector for detecting the position of at least one object point, comprising receiving means for receiving a light emitted from at least one object point, comprising image forming means, a scale plate, and image pickup means, each being disposed along the same optical axis; and arithmetic operation means connected to the image pickup mean; wherein the scale plate has a plurality of pattern elements arranged periodically along a front coordinate plane perpendicularly intersecting the optical axis, the image forming means includes means for condensing a light beam emitted from an object point, converting the beam into a corresponding reference light converging into a corresponding image forming point which is displaced from the front coordinate plane of the scale plate, spot-illuminating a part of the scale plate with the and projecting at least one illuminated pattern element in a magnified scale, the image pickup means has a light receiving surface which is disposed along a rear coordinate plane perpendicularly intersecting the optical axis and which picks up a shadow of the at least one illuminated pattern element projected in the magnified scale and includes means for outputting corresponding image data, and the arithmetic operation means includes means for processing the image data, deriving a rear coordinate plane value of the shadow of the at least one illuminated pattern element, determining a position of the image forming point for the reference light on the basis of the respective rear coordinate plane value and a front coordinate plane value of the at least one illuminated pattern element, and determining a position of the object point on the basis of the position of the image forming point.

2. An optical position detector according to claim 1; wherein the plurality of pattern elements of the scale plate are arranged two-dimensionally along the front coordinate plane, the image pickup means picks up planarly the shadow of the at least one illuminated pattern element projected in the magnified scale and outputs corresponding two-dimensional image data, and the arithmetic operation means includes means for processing the two-dimensional image data, deriving a two-dimensional rear coordinate plane value of the shadow of the at least one projected pattern element, determining a two-dimensional position of the image forming point of the reference light on the basis of the two-dimensional front coordinate plane value of the at least one projected pattern element, and determining a two-dimensional position of the object point on the basis of the two-dimensional position of the image forming point.

3. An optical position detector according to claim 2; wherein the arithmetic operation means further comprises means for integrating the two-dimensional image data to form an orthogonal pair of one-dimensional profile data, and means for analyzing the pair of one-dimensional profile data to detect the two-dimensional rear coordinate plane value of the shadow of the at least one projected pattern element.

4. An optical position detector according to claim 2; wherein the image pickup means includes means for receiving at least one pair of shadows of illuminated pattern elements projected in a magnified scale and outputting corresponding image data, and the arithmetic operation means includes means for processing the image data, deriving two-dimensional rear coordinate plane values of the at least one pair of shadows of the projected pattern elements, determining a three-dimensional position of the image forming point on the basis of the two-dimensional rear coordinate plane values and the two-dimensional front coordinate plane values of the at least one pair of projected pattern elements, and determining a three-dimensional position of the object point on the basis of the three-dimensional position of the image forming point.

5. An optical position detector according to claim 1;

wherein the image pickup means includes means for picking up a plurality of shadows of pattern elements projected in a magnified scale, which are mutually separated by light beams emitted from a plurality of object points, and for outputting corresponding image data, and the arithmetic operation means includes means for processing the image data and deriving rear coordinate plane values for each shadow of the projected pattern elements to thereby effect independent and simultaneous determination of positions of the plurality of object points.

6. An optical position detector according to claim 1; wherein the image pickup means further comprises an image intensifier for amplifying a reference light.

7. An optical position detector according to claim 1; further comprising a computer for monitoring a movement or a displacement of the at least one object point by analyzing the position of the at least one object point determined by the arithmetic operation means over the course of time.

8. An optical position detector for optically detecting a position of an object point, comprising: lens means for collecting a light originating from an object point to form a reference beam converging at a focal point; a scale plate disposed behind the lens means displaced from the focal point and having a plurality of pattern elements arranged periodically such that the scale plate is spot-illuminated by the reference beam to project an enlarged shadow of a particular pattern element which corresponds to a position of the object point; pickup means for picking up an image of the projected shadow and outputting corresponding image data; and processing means for processing the image data to calculate a coordinate of the projected shadow of the particular pattern element and determining the position of the object point in accordance with the coordinate of the projected shadow.

9. An optical-position detector according to claim 1; wherein the scale plate has a plurality of pattern elements arranged periodically at a constant pitch along the front coordinate plane.

10. An optical position detector according to claim 1; wherein the image forming means, the scale plate and the image pickup means are disposed sequentially such that a light beam emitted by an object point is received by the image forming means, the reference light is received by the scale plate, and the at least one illuminated pattern element projected in a magnified scale is received by the image pickup means.

11. An optical position detector according to claim 8; further comprising an image intensifier for amplifying a weak reference beam.

12. An optical position detector for detecting the position of at least one object point, comprising: receiving means for receiving a light beam which is emitted from at least one object point and converges at a particular focal point; and arithmetic processing means connected to the receiving means; wherein the receiving means comprises a scale plate for receiving a light beam emitted from at least one object point and having a plurality of pattern elements arranged along a first coordinate plane which is displaced from the focal point such that a light beam incident on the scale plate causes a shadow image of at least one pattern element to be projected in a magnified scale, and image pickup means including a light receiving surface disposed in a second coordinate plane for receiving a shadow image of the at least one illuminated pattern element and means for outputting corresponding image data; and wherein the arithmetic processing means comprises means for determining a position of a respective shadow image in the second coordinate plane and for determining the position of the at least one object point in accordance therewith.

13. An optical position detector according to claim 12; wherein the receiving means further comprises image forming means for receiving a light beam emitted from each of a plurality of object points and producing corresponding reference lights which converge at a particular reference point which is displaced from the reference point and for illuminating the scale plate with the reference lights; and the image forming means, the scale plate and the image pickup means are disposed sequentially along the same optical axis, such that the first and second coordinate planes perpendicularly intersect the optical axis.

14. An optical position detector according to claim 12; wherein the scale plate has a plurality of pattern elements arranged periodically at a constant pitch along the first coordinate plane.

15. An optical position detector according to claim 12; wherein the image data is two-dimensional data, and the arithmetic processing means includes means for integrating the image data to form an orthogonal pair of one-dimensional profile data and processing the pair of one-dimensional profile data to detect the two-dimensional position of the respective shadow images in the second coordinate plane.

16. An optical position detector according to claim 12; wherein the image pickup means includes means for receiving at least one pair of shadow images projected in a magnified scale and outputting corresponding image data, and the arithmetic processing means includes means for processing the image data, determining the two-dimensional position of the respective shadow images in the second coordinate plane, and determining the three-dimensional position of the at least one object point in accordance therewith.

17. An optical position detector according to claim 12; wherein the image pickup means includes means for receiving a plurality of shadow images which are mutually separated by light beams from a plurality of object points and outputting corresponding image data, and the arithmetic processing means includes means for processing the image data and determining the position of each shadow image on the second coordinate plane, such that the arithmetic processing means effects independent and simultaneous determination of the positions of the object points.

* * * * *